United States Patent [19]

Spannhake

[11] Patent Number: 4,580,078
[45] Date of Patent: Apr. 1, 1986

[54] METHOD OF ADJUSTING COLOR PURITY IN A TELEVISION RECEIVER, AND TELEVISION RECEIVER WITH PURITY-ADJUSTMENT SYSTEM

[75] Inventor: Dieter Spannhake, Reinheim, Fed. Rep. of Germany

[73] Assignee: Robert Bosch GmbH, Stuttgart, Fed. Rep. of Germany

[21] Appl. No.: 575,854

[22] Filed: Feb. 1, 1984

[30] Foreign Application Priority Data

Mar. 26, 1983 [DE] Fed. Rep. of Germany ....... 3311102

[51] Int. Cl.$^4$ ............................................. H01J 29/06
[52] U.S. Cl. ...................................... 315/8; 313/437; 358/29; 361/150
[58] Field of Search ............. 358/29; 313/437; 315/8; 361/150

[56] References Cited

U.S. PATENT DOCUMENTS

| 3,295,009 | 12/1966 | James | 315/8 |
|---|---|---|---|
| 3,404,307 | 10/1968 | Hayden | 315/8 |
| 3,582,721 | 6/1971 | Van Hoorn et al. | 315/8 |
| 3,784,868 | 1/1974 | Shinkai et al. | 315/8 |
| 3,947,632 | 3/1976 | Giger et al. | 315/8 |
| 3,982,153 | 9/1976 | Burdick et al. | 315/8 |
| 4,153,858 | 5/1979 | Schylander | 315/8 |

FOREIGN PATENT DOCUMENTS 0104187 9/1980 Japan ..................... 315/8

Primary Examiner—Saxfield Chatmon
Attorney, Agent, or Firm—Frishauf, Holtz, Goodman & Woodward

[57] ABSTRACT

To correct the beam direction, and thus the color purity of color television tubes, particularly in tubes having fixedly secured deflection systems (10), the deflection field is, upon adjustment for color purity, additionally modified by introducing a unidirectional magnetic field extending with its field lines parallel to the z-axis of the tube. After adjustment to move a predetermined color, for example red, from non-deflected or hardly deflected central beam positions into the center of the CRT, the d-c unidirectional field is then disconnected, and the apertured mask demagnetized, as conventional. For demagnetization, the already present demagnetization coil (9) on the tube may be used, by applying a constant voltage thereto, for example of 12 V. The decaying demagnetizing field can be derived from a transformer connected to network power (FIG. 2) or through an oscillatory circuit formed by a charge capacitor (17).

9 Claims, 4 Drawing Figures

METHOD OF ADJUSTING COLOR PURITY IN A TELEVISION RECEIVER, AND TELEVISION RECEIVER WITH PURITY-ADJUSTMENT SYSTEM

The present invention relates to television receivers, and more particularly to a method and a receiver in which the purity of color reproduction on a color television receiving tube can be readily controlled.

BACKGROUND

It has previously been proposed to adjust the purity of color in a TV receiver by the "red ball method", which, briefly, is carried out this way:

The apparatus is located in North-South direction and a signal is applied thereto which should provide a red surface display. By shifting the deflection system backwardly and forwardly, it is possible to place a raster of pure red color derived by the cathode beam. The thus generated pure-red color is then shifted to occur at the center position of the cathode ray tube (CRT) by rotating the color-purity magnets. After centering, and upon considering the static convergence, the deflection system is so shifted or moved that the red surface will be uniform over the entire surface of the CRT. The blue and green zones are also checked.

The precise position of the deflection system on the neck of the CRT can be located by checking the screen with a microscope. The deflection system is so positioned that the beam will impinge on the appropriate phosphor points also in the corners of the CRT. The deflection system is then secured to the neck of the CRT, for example by clamping, and is adhesively connected and sealed by rubber wedges and the like to the neck of the CRT.

Fine adjustment of the CRT with a self-converging sytem after locating the receiver in a specific place usually is not provided. Likewise, precisely adjusted deflection systems having convergence circuits are usually not readjusted after locating the receiver in a specific place.

Particularly precisely adjusted receivers, which were worked on by qualified, highly skilled personnel, usually have excellent convergence and beam impingement location. It is desirable to avoid readjustment or recalibration after the apparatus is placed in a specific user's location; usually no skilled personnel and monitoring equipment is available at such locations.

It is possible that, when a receiver is located at a desired random location, stray or foreign fields may interfere with color purity. This may occur, for example, due to substantial change in the magnetic field of the earth. For color purity, the color purity magnets will then have to be readjusted. The position of the deflection system may be retained.

If the above referred-to and standard sequence of adjustment is followed, finding the exact impingement point of the beam requires loosening and shifting of the deflection system. Thus, a position which previously was found and carefully and precisely adjusted is lost again, and the overall calibration for color purity at a specific location must be done anew. Frequently, the conditions under which readjustment is to be made are poor.

Complete correction and adjustment of color purity over the entire surface of the CRT involves adjustment, checking, readjustment, rechecking, over and over again, straining the patience of operating personnel and resulting, hardly ever, in perfectly adjusted receivers.

THE INVENTION

It is an object to permit correction of the position of the color-purity control magnets without requiring readjustment or shifting of position of the deflection system.

Briefly, a magnetic, unidirectional field is generated such that the field lines extend parallel to the z-axis of the CRT; the z-axis, as used herein, is defined as an axis which extends at right angles to the screen of the tube. The electron beam is then generated and focussed on the phosphors of the screen which emit the predetermined color, preferably red, when excited by the electron beam. The color purity magnets are then adjusted to generate a pure image of the predetermined color in the center of the screen; and the unidirectional field is then removed from the tube.

In accordance with a particularly simple arrangement, the unidirectional magnetic field is generated by a coil placed around the CRT which, in the simplest form, may be the already present and existing demagnetization coil or winding. The demagnetization coil, in accordance with a feature of the invention, can be selectively connected to a d-c source to first generate the unidirectional field, and then to an a-c source, of decreasing amplitude, to effect demagnetization of the CRT.

The method and receiver have the advantage that the color purity can be controlled and adjusted without requiring readjustment or shifting of the deflection system.

DRAWINGS

DETAILED DESCRIPTION

Figures 1A, 1B:
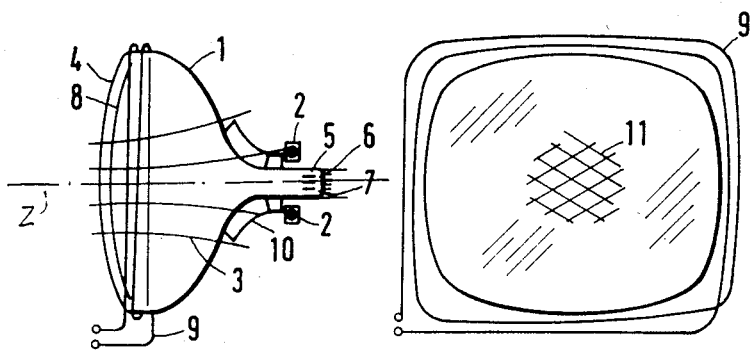
FIG. 1a is a schematic side view of a television receiver-type cathode ray tube (CRT)
FIG. 1b is a front view of the CRT.

FIG. 1 illustrates, collectively,—highly schematically—a CRT 1 which, as well known, includes a phosphorescent screen 4, an apertured mask 8 formed with holes or slits, three electron beam systems 5, 6, 7 for the respective color signals R (red), G (green) and B (blue). The CRT 1 has a demagnetization coil 9 located around the forward portion thereof, and includes, further, a deflection system 10. Color-purity correction magnets 2 are located around the neck portion of the CRT. All the elements, so far described, are well known and may be in accordance with any standard and suitable construction. No change to those elements is necessary in order to practice the present invention, and thus a detailed description is not needed.

The apertured mask 8 is used to provide for impingement of an electron beam only on that one of the color points with which the respective beam is associated. This, however, requires that the electron beams pass through the mask precisely from that point in which, when the tube was made, the light source was located which illuminated the respective color point. Any deviations, for example due to interferences by the earth's magnetic field, can be compensated by rotating the correction magnets 2.

Basic Concept of Alignment

The "red ball" method, referred to in the introduction, includes the step of shifting the magnets of the deflection system 10 in such a way that only the beam system for red is controlled. Electron beams which are only slightly deflected thus can generate pure color upon impingement on the screen. A surface 11, pure red, will then be generated on the screen—see FIG. 1b. By rotation of the color-purity magnets 2, this surface 11 is centered on the screen. After correct centering, the deflection system is then moved into a position such that the red color will appear uniformly over the entire surface of the screen. The colors blue and green are likewise checked.

The deflection system must be precisely located on the neck of the CRT, and subsequent correction at a specific location of the user, where, for example, there may be disturbances of the earth's magnetic field, is hardly possible.

In accordance with a feature of the invention, a magnetic unidirectional field is generated which extends parallel to the center axis Z of the CRT, by generating a magnetic field shown schematically by field lines 3. This field—except for defocussing—hardly influences the electron beam, so long as it is in the vicinity of the z-axis. Electron beams which are deflected are, however, rotated about the z-axis so that, after passing through the mask 8, they no longer impinge on the respective phosphor points. Upon commanding the beam system for red, again, a red surface 11 is generated which, in well known manner by control of the color-purity system 2, can be centered on the screen of the CRT.

The unidirectional field 3 can be generated in various ways. In accordance with a feature of the present invention, the demagnetization winding or coil 9 is used. These windings are already present on the tube and, thus, no additional structure on the tube is needed. It is, however, also possible to place an additional coil in the forward region of the CRT.

Figure 2:
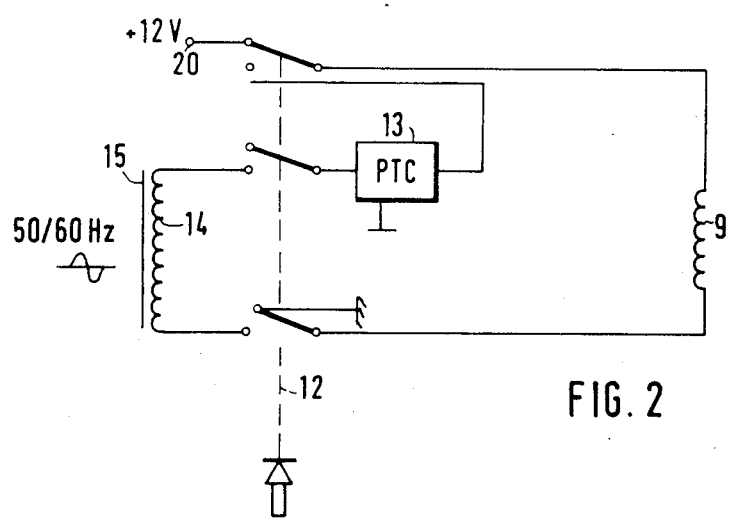
FIG. 2 is a first embodiment of a circuit used in the method, and connectable to the tube of FIG. 1 (collectively)

Method of adjustment, with reference to FIG. 2:

A switch 12 is provided for selective switching of the coil 9 either to a source of direct voltage, for example source 20 of +12 V, or to a source of alternating current, for example of network frequency (50/60 Hz), provided by the secondary 14 of a transformer 15. The switch 12 can be a push-controlled switch, shown in FIG. 2 in the position for adjustment of the CRT.

A d-c voltage of, for example, 12 V is applied to the coil 9 over the respective contacts or terminals of the switch 12, the voltage being derived from a terminal 20. The color purity is then adjusted, as well known, and as previously described. Thereafter, the switch 12 is released, and the switch terminals which will switch over to the position which is not shown in FIG. 2. This connects the coil 9 to the secondary 14 of a network transformer 15 over a resistor 13 having a positive temperature coefficient of resistance (PTC), so that alternating current will flow through the coil 9 which, initially, when the PTC resistor 13 is cold, is of substantial magnitude and which decays as the PTC resistor 13 increases in resistance.

In accordance with the method, thus, and in accordance with a feature of the invention, the unidirectional field is first generated and, thereafter, demagnetization occurs automatically. Switch 12 may, for example, be spring-loaded, and, in normal, spring-held position, be connected in the position not shown in FIG. 2.

Figure 3:
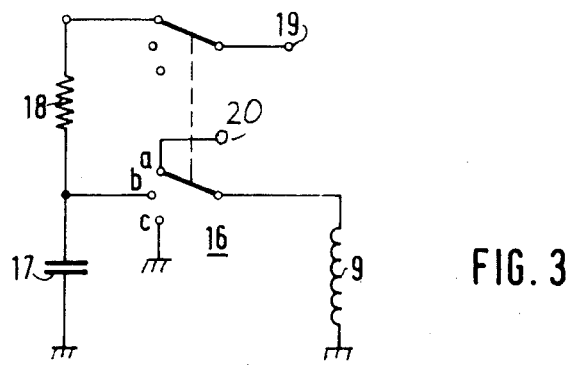
FIG. 3 illustrates another embodiment. The same reference numerals have been used for similar elements shown in the various Figures.

Embodiment of FIG. 3: The d-c field is generated similar to the arrangement of FIG. 2, by applying a unidirectional voltage of, for example, 12 V to the coil 9 which can be the standard demagnetization coil, present on commercial CRTs. The switch 16 is placed in position a. A source, of high direct voltage, for example 500 V, is applied to terminal 19. Terminal 19 is connected through a charging resistor 18 to a capacitor 17. During the time the d-c field is applied to the CRT via coil 9 and terminal 20, capacitor 17 is charged over resistor 18. For demagnetization, switch 16 is rotated to the position where the switch blades contact the terminals b. Capacitor 17 now will discharge through coil 9, and the field-generated voltage from terminal 20 will be disconnected. Due to the parallel connection of capacitor 17 and coil 9, a damped, decaying, oscillating, alternativing field will be generated, which demagnetizes the CRT. To prevent excessive damping, resistor 18 preferably has a relatively high resistance value, for example 1 meg ohm, and terminal 19 a comparatively high voltage, for example 500 V, in order to charge the capacitor 17 to a high voltage. The switch 16 is so arranged that the voltage source 19 is disconnected from the resistor 18 at the same time the switch 16 is changed from the position a to the position b, so that only a damped oscillation, without d-c components, is applied to the coil 9. It would, however, also be possible to leave the source 19 permanently connected to the resistor 18. In that case, and after decay of the damped oscillation, a d-c component will be applied to the coil 9, determined by the voltage and the resistance of resistor 18. If the value of the resistor 18 is high—for example 1 meg ohm—the current is so small that no disturbing influences are generated thereby. By using the two-pole switch as shown in FIG. 3, however, and disconnecting the source 19 from the resistor 18, even this minor residual current can be separated from the coil 9, so that no d-c component will remain in coil 9.

The switch 16, preferably, has a third c position, in which the coil 9 is grounded, and no correction for color purity or demagnitzation will result.

Various changes and modifications may be made, and any features described herein may be used with any of the others, within the scope of the inventive concept.

I claim:

1. Method of adjusting a color television reproduction tube (1) for color purity having
   a screen (4);
   color-purity control magnets (2) located on the tube, and a deflection system (10) located on the tube, comprising the steps of
   generating a magnetic unidirectional field (3) which is characterized by field lines extending parallel to the z-axis (z) of the tube,
   in which the z-axis is defined to extend at right angles to a central zone of the screen (4) of the tube;
   emitting an electron beam and focussing the beam on a phosphor of the screen which emits a predetermined color when excited by the electron beam;
   adjusting the position of the color-purity control magnets (2) to generate an image of said predetermined color on the center of the screen during persistence of said unidirectional field (3);
   and then terminating generation of said unidirectional field.

2. Method according to claim 1, wherein said predetermined color is the red color.

3. Method according to claim 1, including the step of demagnetizing an apertured mask (8) of the tube by applying a decaying alternating field in the z-axis.

4. Method according to claim 1, wherein the tube (1) includes a coil (9) wound about the tube (1), said coil having a coil axis coincident with the z-axis of the tube (1), and the step of generating the magnetic unidirectional field comprises energizing said coil.

5. Method according to claim 1, wherein the tube comprises a demagnetizing coil (9) for demagnetizing an apertured mask (8) of the tube;

and wherein the step of generating the magnetic unidirectional field comprises energizing said demagnetizing coil with electrical direct current.

6. Color television receiver having a color television tube (1), said tube having
   a screen (4);
   color-purity control magnets (2) located on the tube;
   a deflection system (10); and a demagnetizing coil (9) having a coil axis which is coincident with a z-axis extending at right angles to a central zone of the screen (4) of the tube, said demagnetizing coil being located about the screen (4) of the tube,
and comprising, in accordance with the invention,
   a d-c source (20);
   a source (13, 14, 15; 17) providing a decaying alternating current;
   and switch means (12, 16) for selectively connecting the d-c source (20) to the coil (9) for selectively applying direct current thereto or to the source of the decaying alternating current for demagnetizing an apertured mask of the tube.

7. Receiver according to claim 6, wherein the source of decaying alternating current comprises a coupling element (14, 15) providing alternating voltage at network power frequency (60 Hz), and a positive temperature coefficient resistor (13) selectively connectable between the coil (9) and said network connection.

8. Receiver according to claim 7, wherein said network connection comprises a transformer.

9. Receiver according to claim 6, wherein the source for generating a decaying alternating current comprises an oscillatory circuit including a capacitor (17) and said coil (9);
   a charge connection (18, 19) for charging the capacitor;
   and a switch means selectively connecting the charge capacitor to the coil to form an oscillatory tank circuit, the capacitor discharging through the coil and thereby passing a damped oscillatory current through said coil (9).

* * * * *